United States Patent
Lu et al.

(10) Patent No.: US 9,955,053 B2
(45) Date of Patent: Apr. 24, 2018

(54) IMAGE-CAPTURING ASSEMBLY AND ARRAY LENS UNITS THEREOF

(71) Applicant: HIMAX TECHNOLOGIES LIMITED, Tainan (TW)

(72) Inventors: Yin-Dong Lu, Tainan (TW); Chuan-Hui Yang, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 238 days.

(21) Appl. No.: 14/164,401

(22) Filed: Jan. 27, 2014

(65) Prior Publication Data

US 2015/0215505 A1   Jul. 30, 2015

(51) Int. Cl.
| | |
|---|---|
| *H04N 5/335* | (2011.01) |
| *H04N 5/225* | (2006.01) |
| *G02B 13/00* | (2006.01) |
| *G02B 3/00* | (2006.01) |
| *G03B 17/00* | (2006.01) |

(52) U.S. Cl.
CPC .......... *H04N 5/2254* (2013.01); *G02B 3/0062* (2013.01); *G02B 3/0075* (2013.01); *G02B 13/0085* (2013.01); *G03B 17/00* (2013.01); *H04N 5/2258* (2013.01)

(58) Field of Classification Search
CPC ..... H04N 2201/02493; H04N 1/02885; H04N 3/04; H04N 1/19547
USPC ............................. 348/294–308, 272–275.34
See application file for complete search history.

(56) References Cited

U.S. PATENT DOCUMENTS

| | | | |
|---|---|---|---|
| 8,704,942 B2 * | 4/2014 | Shimoda et al. | 348/350 |
| 8,908,068 B2 * | 12/2014 | Yagyu | 348/272 |
| 2010/0225755 A1 * | 9/2010 | Tamaki | H04N 5/2254 348/78 |
| 2011/0122308 A1 * | 5/2011 | Duparre | 348/340 |
| 2012/0212662 A1 * | 8/2012 | Shimoda | H04N 5/23212 348/349 |
| 2014/0021573 A1 * | 1/2014 | Nishimaki | H01L 27/14607 257/431 |
| 2014/0368723 A1 * | 12/2014 | Jung et al. | 348/340 |

* cited by examiner

*Primary Examiner* — Daniel M Pasiewicz
*Assistant Examiner* — Selam Gebriel
(74) *Attorney, Agent, or Firm* — McClure, Qualey & Rodack, LLP (57) ABSTRACT

An image-capturing assembly is disclosed. The image-capturing assembly includes an array of lens units and an array of optical sensor units. At least one of the lens units includes a first functional lens and a first light-blocking member having an aperture. Each of the optical sensor units includes an image-capture element corresponding to one of the lens units. The first functional lens, the aperture of the first light-blocking member, and one of the image-capture element are arranged along an optical axis, and the aperture of the first light-blocking member is asymmetrical with respect to the optical axis.

17 Claims, 8 Drawing Sheets

FIG. 13

IMAGE-CAPTURING ASSEMBLY AND ARRAY LENS UNITS THEREOF

BACKGROUND OF THE INVENTION

Field of the Invention

The invention relates to an electrical device with an optical element, and in particular to an image-capturing assembly with an array of lens units.

Description of the Related Art

Miniaturized cameras are widely used in many electronic products, such as mobile phones and personal computers. Mobile phones and personal computers employing image-capturing devices have become popular due to employment of solid-state image-capture elements such as CCD (a charged coupled device)-type image sensors, CMOS (a complementary metal oxide semiconductor)-type image sensors, and the like, allowing for higher performance and miniaturization of image-capturing devices.

As advances in semiconductor manufacturing technology will never stop while electronic products are becoming even more compact at the same time, the pixel size of sensors will only become even smaller and the standard for image quality even higher. A conventional lens module, therefore, is not applicable for higher-end lens modules.

BRIEF SUMMARY OF THE INVENTION

One objective of the disclosure is to provide an image-capturing assembly with high imaging quality.

According to some embodiments of the disclosure, an image-capturing assembly includes an array of lens units and an array of optical sensor units. At least one of the lens units includes a first functional lens and a first light-blocking member having an aperture. Each of the optical sensor units includes an image-capture element corresponding to one of the lens units. The first functional lens, the aperture of the first light-blocking member, and one of the image-capture element are arranged along an optical axis, and the aperture of the first light-blocking member is asymmetrical with respect to the optical axis.

In some embodiments, the aperture of the first light-blocking member has a shape construction associated with the shape of the image-capture element. In some embodiments, the aperture of the first light-blocking member and the image-capture element both have rectangular shape.

In some embodiments, the aperture of the first light-blocking member has two long edges opposite to each other, two short edges between the two long edges, and at least one round angle connected between one of the two short edges and the neighboring short edge.

In some embodiments, the aperture of the first light-blocking member has an octagon shape.

In some embodiments, the area of the aperture of the first light-blocking member is smaller than the area of the image-capture element corresponding to the first functional lens.

In some embodiments, the width of the aperture of the first light-blocking member in a direction is smaller than the width of the image-capture element in the same direction.

In some embodiments, the image-capturing assembly also includes a second light-blocking member having an aperture arranged along the optical axis. The aperture of the second light-blocking member is asymmetrical with respect to the optical axis.

In some embodiments, the width of the aperture of the second light-blocking member in a direction is different from the width of the aperture of the first light-blocking member in the same direction. The second light-blocking member is away from the first light-blocking member, and the width of the aperture of the second light-blocking member in a direction is smaller than the width of the aperture of the first light-blocking member.

In some embodiments, the image-capturing assembly further includes a base lens having a flat surface, wherein the first light-blocking member is coated on the flat surface, and the first functional lens is disposed on the first light-blocking member.

According to some other embodiments of the disclosure, an image-capturing assembly includes a number of lens units and a number of optical sensor units. The lens units are arranged adjacent to one the other, and each of the lens units includes a functional lens and a light-blocking member. The light-blocking member has an aperture arranged along an optical axis of the functional lens to alter the shape of the light passing therethrough. The optical sensor units are configured to receive the light passing through the lens units.

In some embodiments, at least one of the apertures of the light-blocking members is asymmetrical with respect to the corresponding optical axis.

In some embodiments, each of the optical sensor units includes an image-capture element, and at least one of the apertures of the light-blocking members has a shape construction associated with the shape of the corresponding image-capture element According to some other embodiments of the disclosure, an array of lens units includes a first lens array layer, a second lens array layer, and a light-blocking layer. The first lens array layer includes a number of first functional lenses. The second lens array layer includes a number of second functional lenses respectively corresponding to one of the first functional lenses. The light-blocking layer is arranged between the first lens array layer and the second lens array layer. The light-blocking layer has a number of apertures respectively corresponding to the first functional lenses.

In some embodiments, at least one of the apertures is asymmetrical with respect to an optical axis of the corresponding first lens.

In some embodiments, the array of lens units further includes a base layer, wherein the light-blocking layer is coated on the surface of the base layer, and the first lens array layer is formed on the light-blocking layer, and the second lens array layer is formed on the surface of the base layer that is opposite to the surface where the light-blocking layer is coated.

In some embodiments, the first functional lenses are arranged in a square matrix form. For example, the first functional lenses are arranged in a 4 by 4 matrix form.

In some embodiments, the light-blocking layer includes a number of light-blocking members respectively with one of the apertures, and the light-blocking members are separated from one the other.

BRIEF DESCRIPTION OF THE DRAWINGS

The invention can be more fully understood by reading the subsequent detailed description and examples with references made to the accompanying drawings.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
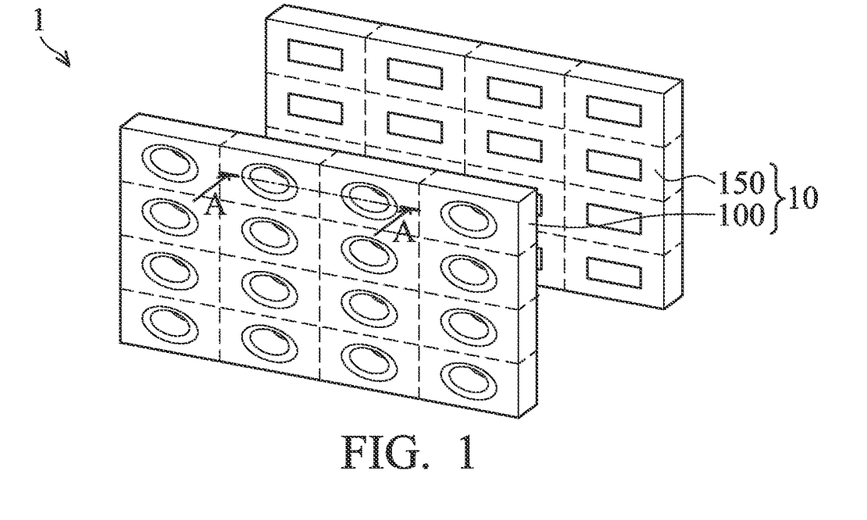
FIG. 1 shows an exploded view of an image-capturing assembly, in accordance with some embodiments.

Referring to FIG. 1, in some embodiments of the present disclosure, an image-capturing assembly 1 includes an array of image-capturing modules 10 arranged in a matrix form. For example, in one embodiment, the image-capturing assembly 1 includes sixteen image-capturing modules 10, and the sixteen image-capturing modules 10 are arranged in a 4 by 4 matrix form. The number of image-capturing modules 10 should not be limited to the embodiment shown in FIG. 1. In some other embodiments, the image-capturing assembly 1 includes four image-capturing modules 10, and the four image-capturing modules 10 are arranged in a 2 by 2 matrix form.

In some embodiments, the array of image-capturing modules 10 includes an array of lens units 100 and an array of optical sensor units 150. Each of the lens units 100 is aligned with one of the optical sensor units 150. Such that light transmitted through the lens units 100 is received by the corresponding optical sensor units 150. The optical sensor units 150 receive the light and produce electrical signals for a processor (not shown in FIG. 1) to generate image information. The structural features of the array of lens units 100 and the array of optical sensor units 150 are described hereinafter.

Figure 2:
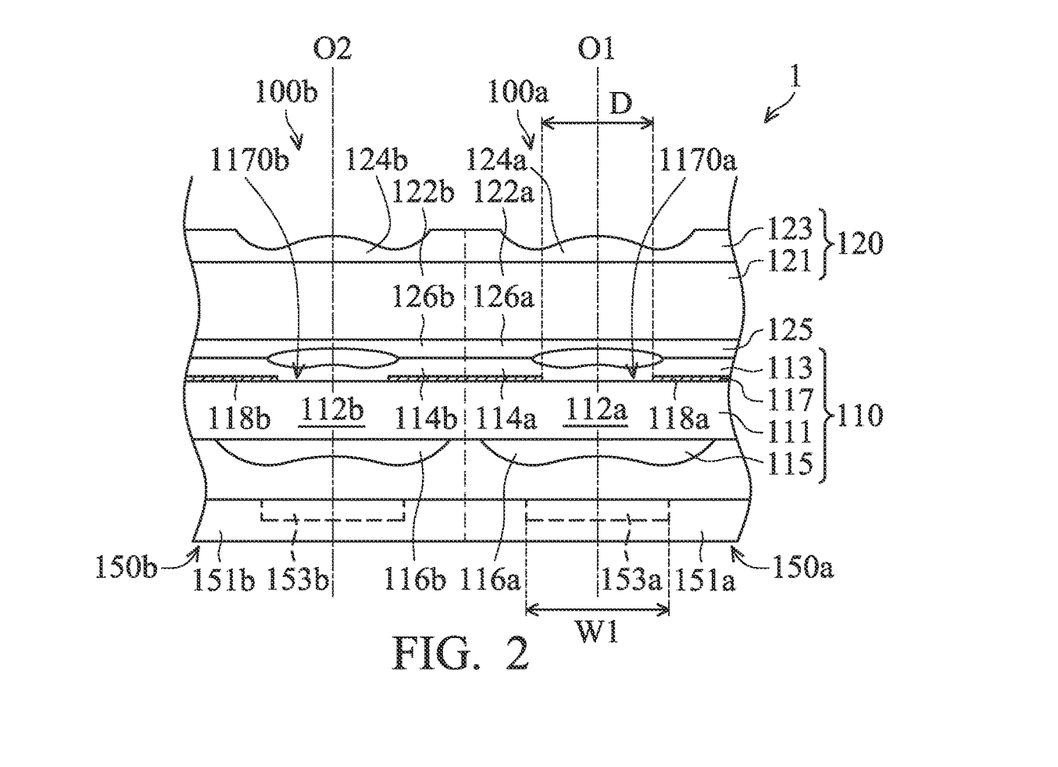
FIG. 2 shows a cross-sectional view taken along the line A-A of FIG. 1.

Referring to FIG. 2, which shows a cross-sectional view taken along the line A-A of FIG. 1. For the purpose of illustration, only the structural features of a lens unit 100a, a lens unit 100b, an optical sensor unit 150a, and an optical sensor unit 150b are described.

The lens unit 100a includes a first base lens 112a, a second base lens 122a, a first functional lens 114a, a second functional lens 116a, a third functional lens 124a, a fourth functional lens 126a, and a light-blocking member 118a, in accordance with some embodiments. The lens unit 100b includes a first base lens 112b, a second base lens 122b, a first functional lens 114b, a second functional lens 116b, a third functional lens 124b, a fourth functional lens 126b, and a light-blocking member 118b, in accordance with some embodiments.

Figure 3:
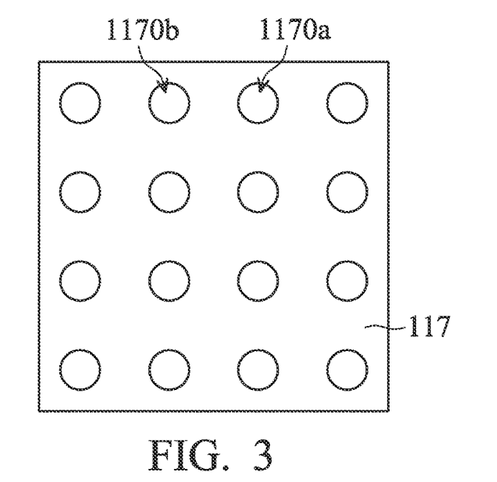
FIG. 3 shows a top view of a light-blocking layer, in accordance with some embodiments.

The manufacturing method, in accordance with some embodiments, of the array of the lens units 100 are described hereinafter. To manufacture the array of lens units 100, a first base body 111 is provided, and a light-blocking layer 117 is directly formed on a surface of the second base body 111 by a suitable process, such as coating. The light blocking layer 117 includes a plurality of light-blocking members, such as the light-blocking members 118a and 118b. The light-blocking member 118a has an aperture 1170a. The aperture 1170a is aligned with the optical axis O1 and is axially symmetric with the optical axis O1. The light-blocking member 118b has an aperture 1170b. The aperture 1170b is aligned with the optical axis O2 and axial symmetrical with the optical axis O2. In some embodiments, the light-blocking layer 117 is made of an opaque material. Light is allowed to pass through the light-blocking layer 117 via the apertures 1170 but is reflected or absorbed by the light-blocking layer 117. In some embodiments, the apertures 1170a and 1170b have circular shape, as shown in FIG. 3.

Referring to FIG. 2 again, in some embodiments, a first lens array layer 112 is formed on the light-blocking layer 117 by molding, and a second lens array layer 115 is formed on the surface of the second base body 111 that is opposite to the surface where the light-blocking layer 117 is formed by molding, such that a first stack member 110 is integrally formed by the first base body 111, the first lens array layer 112, the second lens array layer 115, and the light-blocking layer 117.

The first lens array layer 112 includes a plurality of first functional lenses, such as the first functional lenses 114a and 114b. The second lens array layer 115 includes a plurality of second functional lenses, such as the second functional lenses 116a and 116b. The first functional lens 114a and the second functional lens 116a align with the aperture 1170a. The first functional lens 114b and the second functional lens 116b align with the aperture 1170b. That is, the first functional lens 114a, the aperture 1170a, and the second functional lens 116a are arranged along a first optical axis O1, and the first functional lens 114b, the aperture 1170b, and the second functional lens 116b are arranged along a second optical axis O2. The first optical axis O1 is parallel to the second optical axis O2.

Afterward, a second base body 121 is provided, and a third lens array layer 123 and a fourth lens array layer 125 are formed on two opposite sides of the second base body 121 by molding. Such that, a second stacked member 120 is integrally formed by the second base body 121, the third lens array layer 123, and the fourth lens array layer 125.

The third lens array layer 123 includes a plurality of third functional lenses, such as the third functional lenses 124a and 124b. The fourth lens array layer 125 includes a plurality of fourth functional lenses, such as the fourth functional lenses 126a and 126b. The third functional lens 124a is aligned with the fourth functional lens 126a, and the third functional lens 124b is aligned with the fourth functional lens 126b. In some embodiments, the third functional lens 124a and the fourth functional lens 126a are arranged along the first optical axis O1, and the third lens 124b and the fourth lens 126b are arranged along the second optical axis O2.

In some embodiments, the fourth lens array layer 125 is combined with the first lens array layer 113 by suitable means, such as gluing. Such that the first stacked member 110 and the second stacked member 120 are connected.

In some embodiments, the first stacked member 110 and the second stacked member 120 are cut into a number of individuals each including multiple lens units 100. For example, each of the individuals includes sixteen lens units 100 arranged in a 4 by 4 matrix form, as shown in FIG. 1.

Still referring to FIG. 2, the optical sensor unit 150a includes a substrate 151a and an image-capture element 153a, and the optical sensor unit 150b includes a substrate 151b and an image-capture element 153b, in accordance with some embodiments. The substrates 151a and 151b are formed integrally. The image-capture element 153a is aligned with the optical axis O1 and is disposed on the substrate 151a. The image-capture element 153b is aligned with the optical axis O2 and is disposed on the substrate 153a. The image-capture elements 153a and 153b, for example, are complementary metal oxide semiconductor (CMOS) sensors.

Figure 4:
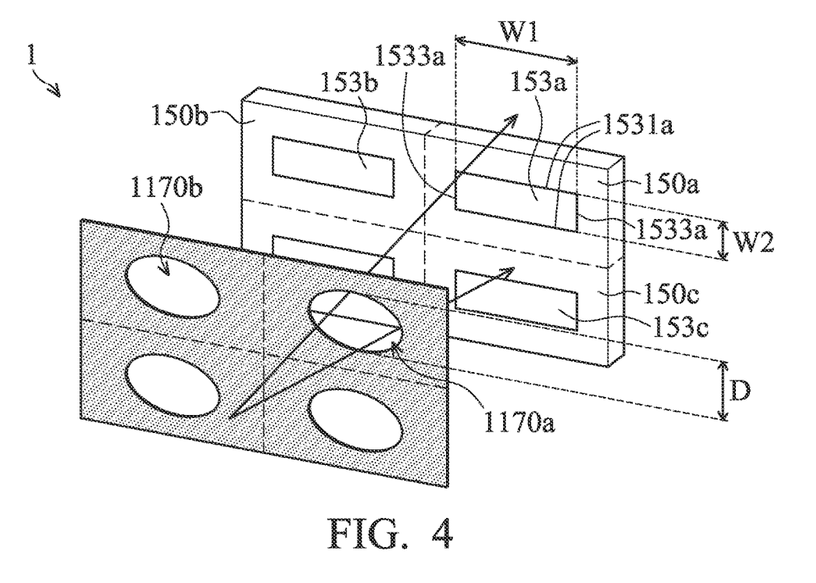
FIG. 4 shows a schematic view of partial elements of an image-capturing assembly as light passing through a light-blocking layer, in accordance with some embodiments.

As shown in FIG. 4, in some embodiments, the image-capture element 153a has a rectangular shape, and the image-capture element 153a has two short sides 1533a and two long sides 1531a. The two short sides 1533a are connected between the two long sides 1531a. In some embodiments, the diameter D of the aperture 1170a is smaller than the width W1 of the two long sides 1531a. In some embodiments, the diameter D of the aperture 1170a is larger than the width W2 of the two short sides 1533a.

To capture an image from outside of the image-capturing assembly 1, light is allowed to pass through the lens units 100a and 100b (FIG. 2) and is received by the optical sensor units 150a and 150b. Since a portion of the light is blocked by the light-blocking layer 117 before its projection on the optical sensor units 150a and 150b, the shape of the light projected on the optical sensor units 150a and 150b is determined by the shape of the apertures 1170a and 1170b formed on the light-blocking layer 117.

Therefore, the light passing through the lens unit 100a is prevented from being projected on the image-capture element 153b of the optical sensor unit 150b, and the image quality of the image-capture element 153b is improved. However, due to the fact that the aperture 1170a has a circular shape, and a portion of the light passing through the lens unit 100a may possibly be projected on an image-capture element 153c of another optical sensor unit 150c which is adjacent to the image-capture element 153a in the direction in which the two short sides 1533a extend, this may adversely affect the image quality of the image-capture element 153c.

To solve the problem mentioned in the embodiments set forth, some other embodiments are further provided.

Figure 5:
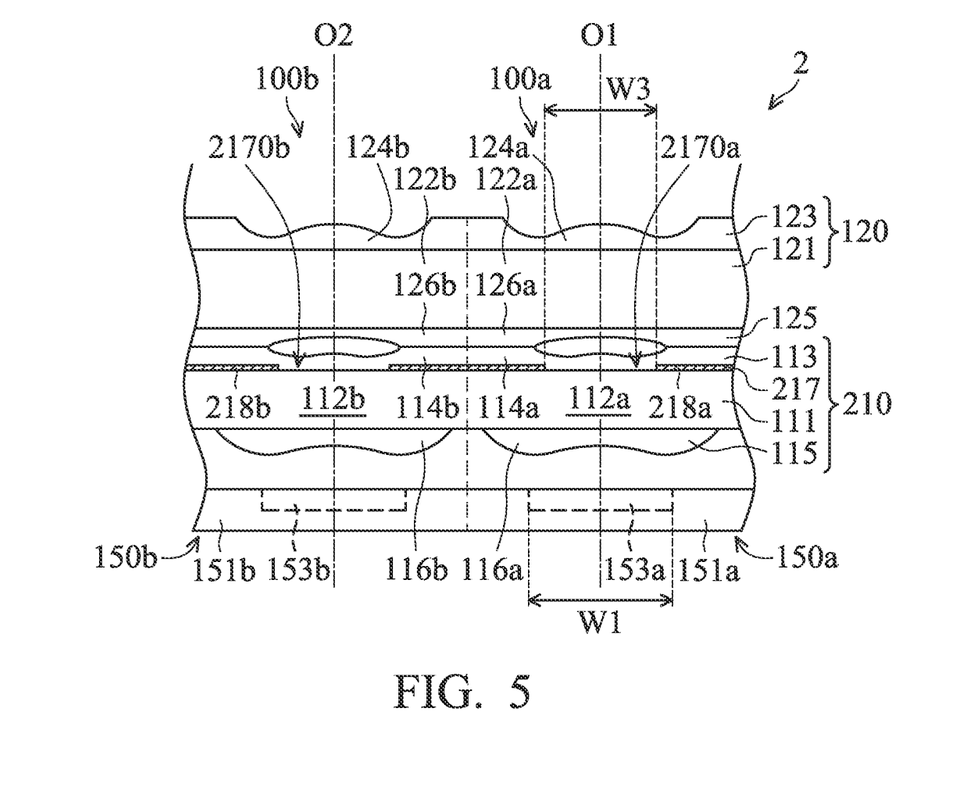
FIG. 5 shows a cross-sectional view of an image-capturing assembly, in accordance with some embodiments.
Figure 6:
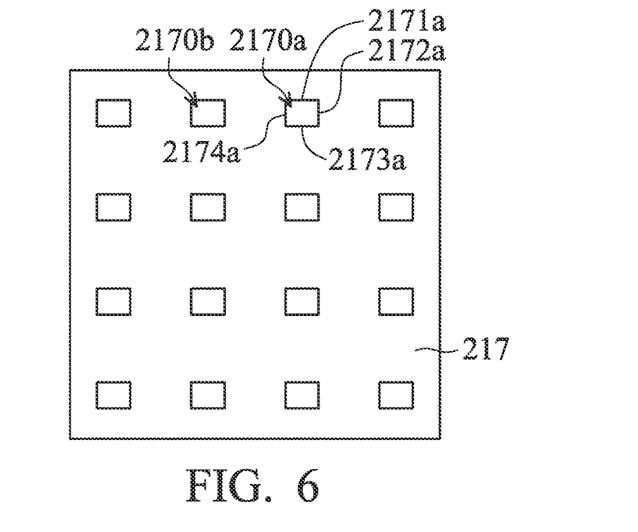
FIG. 6 shows a top view of a light-blocking layer, in accordance with some embodiments.

Referring to FIGS. 5 and 6, FIG. 5 shows a cross-sectional view of partial elements of an image-capturing assembly 2, and FIG. 6 shows a top view of partial elements of a light-blocking layer 227, in accordance with some embodiments. In FIGS. 5 and 6, similar elements are provided with the same reference numbers, wherein the features of the similar elements are not reiterated in the interest of brevity.

The image-capturing assembly 2 differs from the image-capturing assembly 1 as shown in FIG. 2 in that the light-blocking layer 117 of the image-capturing assembly 1 is replaced with a light-blocking layer 217.

In some embodiments, the light-blocking layer 217 is formed directly on the surface of the second base body 121 by coating. The light-blocking layer 217 includes a plurality of light-blocking members, such as the light-blocking members 218a and 218b. The light-blocking member 218a has an aperture 2170a. The aperture 2170a is aligned with the optical axis O1. The light-blocking member 218b has an aperture 2170b. The aperture 2170b is aligned with the optical axis O2. In some embodiments, the light blocking layer 217 is made of an opaque material. Light is allowed to pass through the light-blocking layer 217 via the apertures 2170a and 2170b but us reflected or absorbed by the light-blocking layer 217.

In some embodiments, some of the apertures formed on the light-blocking layer 217 are asymmetrical with respect to the corresponding optical axis, and the shape of the apertures is associated with the shape of the corresponding image-capture element. For example, the aperture 2170a of the light-blocking layer 217 is asymmetrical with respect to the optical axis O1. The aperture 2170a has a rectangular shape with two long edges 2171a and 2173a and two short edges 2172a and 2174a.

Figure 7:
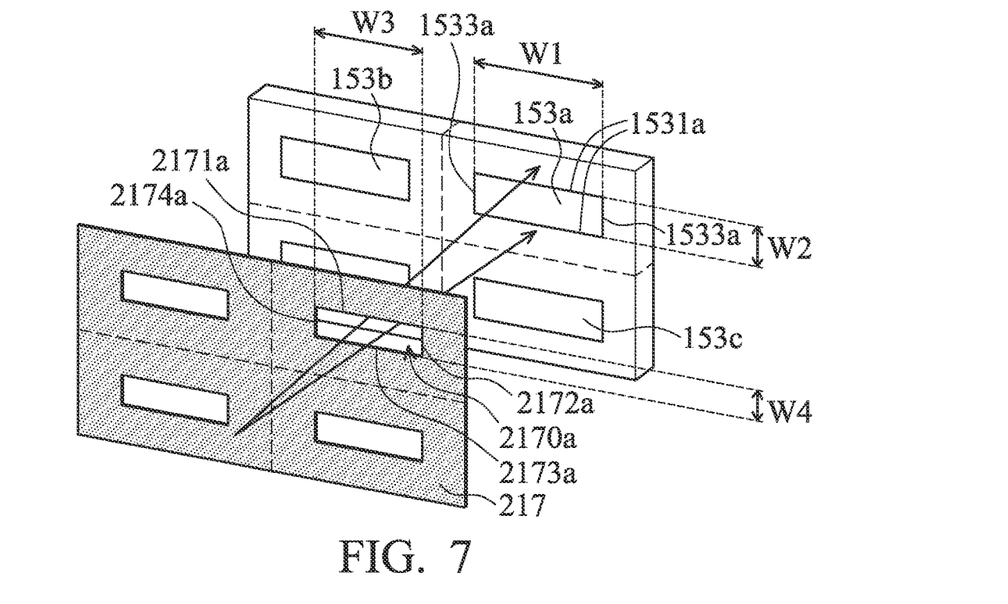
FIG. 7 shows a schematic view of partial elements of an image-capturing assembly as light passing through a light-blocking layer, in accordance with some embodiments.

Referring to FIG. 7, in some embodiments, the two long edges 2171a and 2173a are parallel to the two long sides 1531a, and the two short edges 2172a and 2174a are parallel to the two short sides of the two short sides 1533a. In some embodiments, the area of the aperture is smaller than the area of the corresponding image-capture element. For example, the area of the aperture 2170a is smaller than the area of the corresponding image-capture element 153a. In some embodiments, the width W3 of the aperture 2170a along the two long edges 2171a and 2173a is smaller than the width W1 of image-capture elements 153a along the two long sides 1531a. In some embodiments, the width W4 of the aperture 2170a along the two short edges 2172a and 2174a is smaller than the width W2 of the image-capture elements 153a along the two short sides 1533a.

Still referring to FIG. 7, with a decrease of the aperture rate of the light-blocking layer 217, the light passing through one of the apertures of the light-blocking layer 217 is sufficiently projected on the corresponding image-capture element. For example, the light passing through the aperture 2170a of the light-blocking layer 217 is sufficiently projected on the image-capture element 153a. As a result, the quality of images produced by the image-capture element 153b and/or the image-capture element 153c is improved.

The shape of the apertures of the light-blocking layer should not be limited to the embodiments set forth. Some the other embodiments are provided in the following descriptions.

Figure 8:
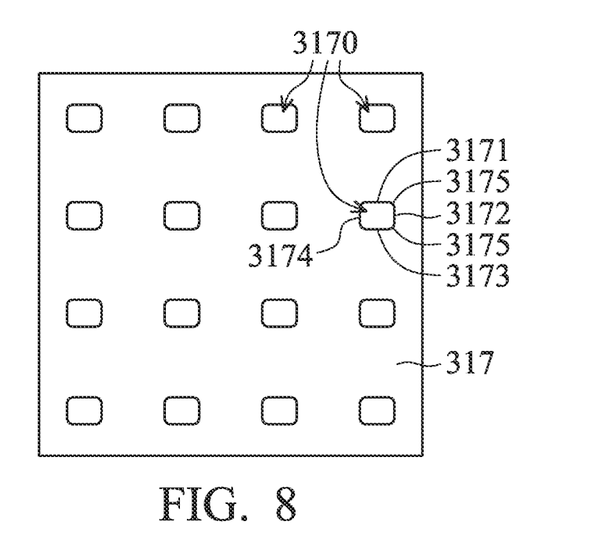
FIG. 8 shows a top view of a light-blocking layer, in accordance with some embodiments.

Referring to FIG. 8, in some embodiments, at least one of apertures of a light-blocking layer is asymmetrical with respect to the corresponding optical axis, and at least one of the included angles between any two adjacent edges of the aperture is not a right angle. For example, the aperture 3170 of a light-blocking layer 3172 is asymmetrical with respect to the optical axis passing therethrough. The aperture 3170 includes two long edges 3171 and 3173, two short edges 3172 and 3174, and four round angles 3175. The two long edges 3171 and 3173 are opposite to each other, and two short edges 3172 and 3174 are between the two long edges 3171 and 3173. The four round angles 3175 are respectively connected between the two short edges 3172 and the neighboring two long edges 3171 and 3173. In some other embodiments, some of the included angles between two of the adjacent edges are right angles, and some of the included angles between two of the adjacent edges are not right angles.

Figure 9:
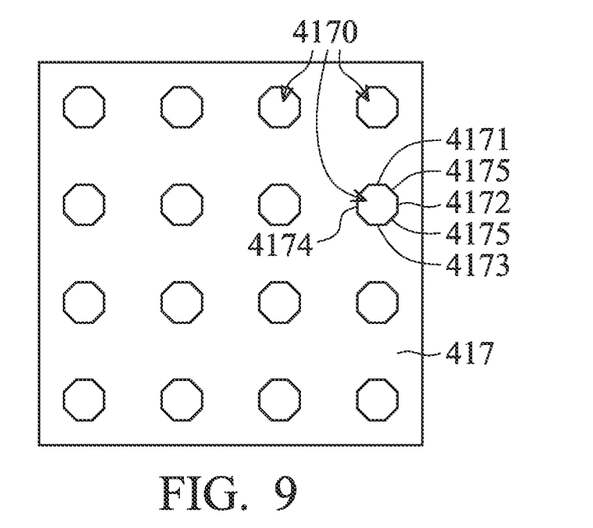
FIG. 9 shows a top view of a light-blocking layer, in accordance with some embodiments.

In some embodiments, at least one of the apertures of a light-blocking layer is asymmetrical with respect to a corresponding optical axis, and the apertures include more than four edges. For example, as shown in FIG. 9, apertures 4170 of a light-blocking layer 417 are asymmetrical with respect to the optical axis passing therethrough. The apertures 4170 have an octagon shape with two long edges 4171 and 4173, two short edges 4172 and 4174, and four connected edges 4175 connected between each of the two long edges 4171a and 4173a and the neighboring short edges 4172a and 4174a.

Furthermore, the number of light-blocking layers and the positions of the light-blocking layer should not be limited by the embodiments set forth.

Figure 10:
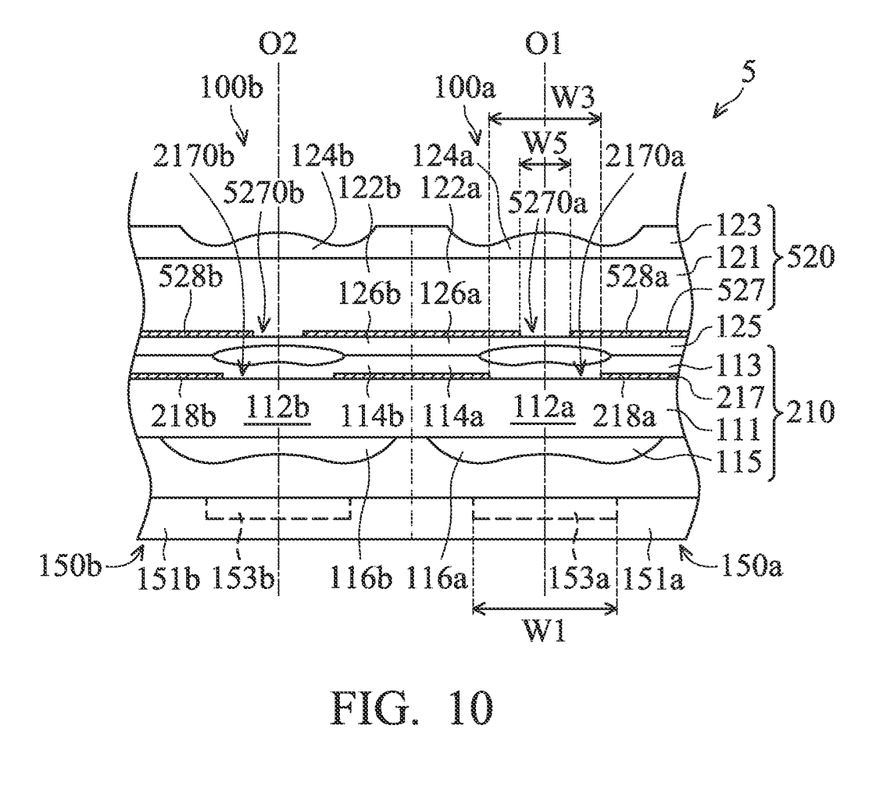
FIG. 10 shows a cross-sectional view of an image-capturing assembly, in accordance with some embodiments.

Referring to FIG. 10, which shows a cross-sectional view of partial elements of an image-capturing assembly 5. In FIG. 10 similar elements are provided with the same reference numbers, wherein the features of the similar elements are not reiterated in the interest of brevity. Compared with the image-capturing assembly 2 shown in FIG. 5, the image-capturing assembly 5 further includes a light-blocking layer 527. The light-blocking layer 527 is formed directly on the surface of the second base body 121 by coating. The surface where the light-blocking layer 527 is formed is opposite to the surface on which the third lens array layer 123 is formed. The second lens array layer 125 is formed on the light-blocking layer 527. In the embodiment, the light-blocking layer 527 is away from optical sensor units 150a and 150b relative to the light-blocking layer 217.

In some embodiments, the light-blocking layer 117 includes a plurality of light-blocking members, such as the light-blocking members 528a and 528b. The light-blocking member 528a has an aperture 5270a. The aperture 5270a is aligned with the optical axis O1. The light-blocking members 528b has an aperture 5270b. The aperture 5270b is aligned with the optical axis O2. In some embodiments, the light blocking layer 527 is made of an opaque material. Light is allowed to pass through the light-blocking layer 527 via the apertures 5270a and 5270b but is reflected or absorbed by the light-blocking layer 527.

In some embodiments, some of the apertures formed on the light-blocking layer 117 are asymmetrical with respect to the corresponding optical axis. The shape of the apertures is associated with the shape of the corresponding image-capture element. For example, the aperture 5270a of the light-blocking layer 527 is asymmetrical with respect to the optical axis O1. The aperture 5270a has a rectangular shape with four edges (not illustrated). In some other embodiment, the apertures are constructed in a shape similar to the apertures shown in any of the embodiments above.

In some embodiments, the apertures arranged along the same optical axis have different widths. In some embodiments, the width of the aperture away from the optical sensor unit along a direction is smaller than the width of the aperture near to the optical sensor unit along the same direction. For example, the aperture 5270a has the width W5. The width W5 of the aperture 5270a is smaller than width W3 of the aperture 2170a.

Figure 11:
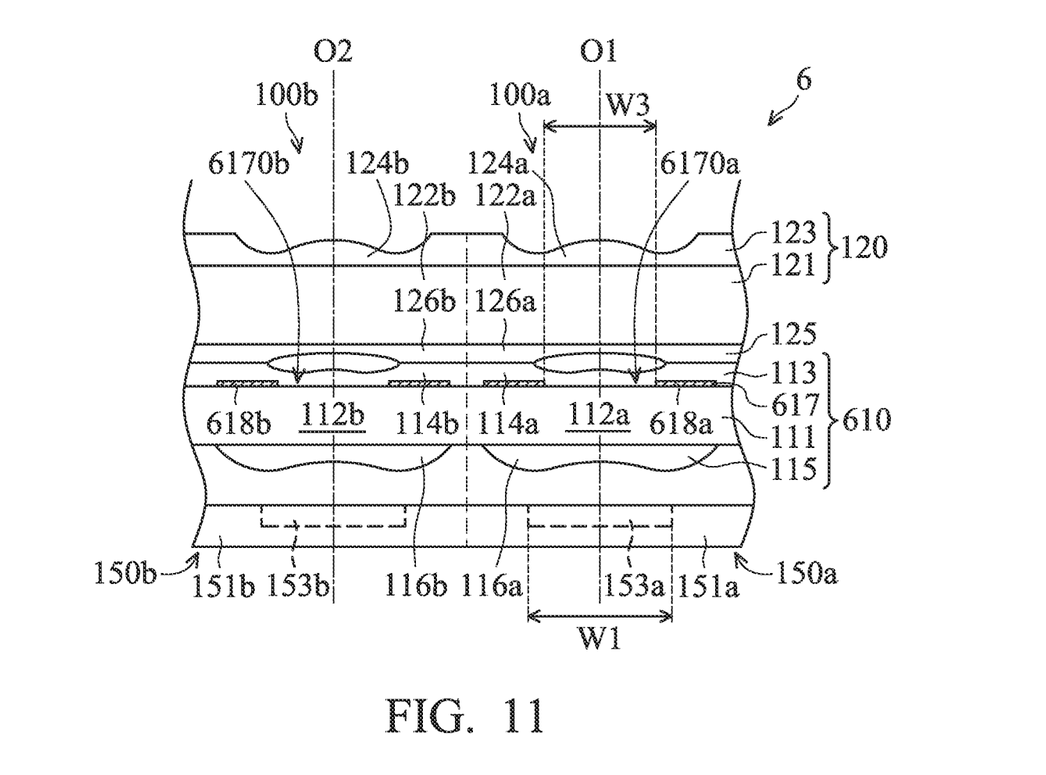
FIG. 11 shows a cross-sectional view of an image-capturing assembly, in accordance with some embodiments.

Referring to FIG. 11, which shows a cross-sectional view of partial elements of an image-capturing assembly 6. The image-capturing assembly 6 differs from the image-capturing assembly 2 as shown in FIG. 5 in that the light-blocking layer 217 of the image-capturing assembly 2 is replaced with a light-blocking layer 617.

In some embodiments, the light-blocking layer 617 is formed directly on the second base body 121 by coating. The light-blocking layer 617 includes a number of ring-shaped light-blocking members, such as the light-blocking members 618a and 618b. At the center of the light-blocking members 618a, an aperture 6170a is formed in. The aperture 6170a is aligned with the optical axis O1. At the center of the light-blocking members 618b, an aperture 6170b is formed in. The aperture 6170b is aligned with the optical axis O2.

In some embodiments, the light blocking layer 617 is made of an opaque material. Light is allowed to pass through the light-blocking layer 617 via the apertures 6170a and 6170b but is reflected or absorbed by the light-blocking layer 617.

In some embodiments, some of the apertures formed on the light-blocking layer 617 are asymmetrical with respect to the corresponding optical axis. In some embodiments, the shape of the apertures is associated with the shape of the corresponding image-capture element. In some embodiments, the apertures are constructed in a shape similar to the apertures shown in any of the embodiments above.

Because of the fact that the light-blocking layer 617 discontinuously extend on the surface of the first base body 111, the other portion of the first base body 111 that is not coated with the light-blocking layer 617 is in direct contact with the first lens array layer 113, enhancing the mechanical strength thereof.

Figure 12:
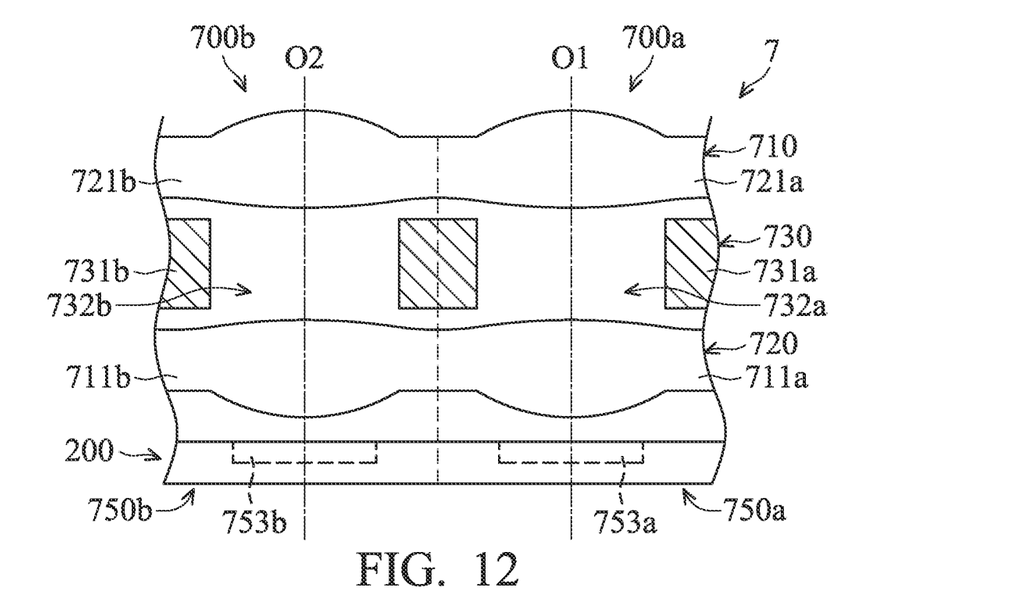
FIG. 12 shows a cross-sectional view of an image-capturing assembly, in accordance with some embodiments.
Figure 13:
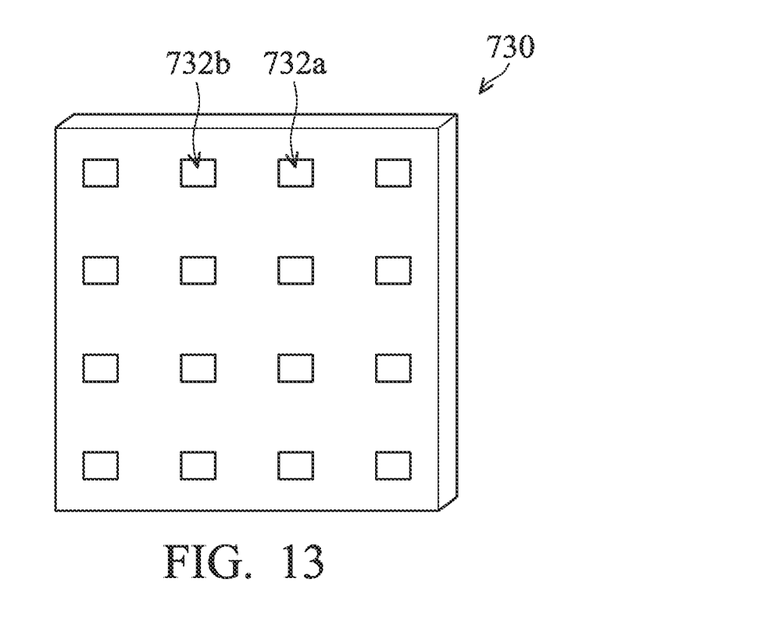
FIG. 13 shows a schematic view of a light-blocking layer, in accordance with some embodiments.

Referring to FIGS. 12 and 13, FIG. 12 shows a cross-sectional view of partial elements of an image-capturing assembly 7, and FIG. 13 shows a schematic view of a light-blocking layer 727, in accordance with some embodiments.

In some embodiments, the image-capturing assembly 7 includes an array of lens units, such as lens unit 700a and 700b, and an array of optical sensor units, such as optical sensor units 750a and 750b, corresponding to the array of lens unit 700a and 700b. The lens unit 700a includes a first functional lens 711a, a second functional lens 721a, and a light-blocking member 731a disposed between the first and the second functional lenses 711a and 721a. The lens unit 700b includes a first functional lens 711b, a second functional lens 721b, and a light-blocking member 731b. The light-blocking member 731a has an aperture 732a, and the light-blocking member 731b has an aperture 732b. The first functional lens 711a, the second functional lens 721a, and the aperture 732a are arranged along the same optical axis O1. The first functional lens 711b, the second functional lens 721b, and the aperture 732b are arranged along the same optical axis O2.

In some embodiments, the first functional lens 711a and the first functional lens 711b are formed integrally as one unit (i.e. lens layer 710), and the second functional lens 721a and the second functional lens 721b are formed integrally as one unit (i.e. lens layer 720), and the light-blocking member 731a and the light-blocking member 731b are formed integrally as one unit (i.e. light-blocking layer 730).

In some embodiments, the apertures 732a and 732b are asymmetrical with respect to the corresponding optical axis, and the shape of the apertures 732a and 732b is associated with the shape of the corresponding image-capture elements 753a and 753b of the optical sensor units 750a and 750b.

With the light-blocking members 731a and 731b, most of the light passing through the lens units is projected on the image-capture elements 753a and 753b of the corresponding optical sensor units 750a and 750b, whereby a reduction of the noise of image-capture elements is achieved.

While the invention has been described by way of example and in terms of preferred embodiment, it is to be understood that the invention is not limited thereto. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An image-capturing assembly, comprising:
an array of lens units, wherein at least one of the lens units comprises a first functional lens, a fourth functional lens, and a first light-blocking member having an aperture, the first functional lens is disposed between the fourth functional lens and the first light-blocking member and contacts the fourth functional lens; and
an array of optical sensor units, wherein each of the optical sensor units comprises an image-capture element corresponding to one of the lens units,
wherein the first functional lens, the aperture of the first light-blocking member, and one of the image-capture element are arranged along an optical axis, and the shape of the aperture of the first light-blocking member has at least one linear side, wherein the width of the aperture of the first light-blocking member in a first direction is smaller than the width of the image-capture element in the first direction, and the width of the aperture of the first light-blocking member in a second direction is smaller than the width of the image-capture element in the second direction, wherein the first direction is perpendicular to the second direction.

2. The image-capturing assembly as claimed in claim 1, wherein the aperture of the first light-blocking member has a shape construction similar to the shape of the image-capture element.

3. The image-capturing assembly as claimed in claim 2, wherein the aperture of the first light-blocking member and the image-capture element both have rectangular shape.

4. The image-capturing assembly as claimed in claim 1, wherein the aperture of the first light-blocking member has two long edges opposite to each other, two short edges between the two long edges, and at least one round angle connected between one of the two short edges and the neighboring short edge.

5. The image-capturing assembly as claimed in claim 1, wherein the aperture of the first light-blocking member has an octagon shape.

6. The image-capturing assembly as claimed in claim 1, wherein the area of the aperture of the first light-blocking member is smaller than the area of the image-capture element corresponding to the first functional lens.

7. The image-capturing assembly as claimed in claim 1, further comprising a second light-blocking member having an aperture arranged along the optical axis.

8. The image-capturing assembly as claimed in claim 7, wherein the aperture of the second light-blocking member is asymmetrical with respect to the optical axis.

9. The image-capturing assembly as claimed in claim 7, wherein the width of the aperture of the second light-blocking member in one direction is different from the width of the aperture of the first light-blocking member in the same direction.

10. The image-capturing assembly as claimed in claim 9, wherein the second light-blocking member is away from the first light-blocking member, and the width of the aperture of the second light-blocking member in one direction is smaller than the width of the aperture of the first light-blocking member.

11. The image-capturing assembly as claimed in claim 1, further comprising a base lens having a flat surface, wherein the first light-blocking member is coated on the flat surface, and the first functional lens is disposed on the first light-blocking member.

12. An array of lens units, comprising:
a first lens array layer, comprising a plurality of first functional lenses;
a second lens array layer, comprising a plurality of second functional lenses respectively corresponding to one of the plurality of first functional lenses;
a light-blocking layer, arranged between the first lens array layer and the second lens array layer, wherein the light-blocking layer has a plurality of apertures respectively corresponding to the plurality of first functional lenses; and
a fourth lens array layer, wherein the first lens array layer is disposed between the fourth lens array layer and the light-blocking layer and contacts the fourth lens array layer,
wherein the shape of at least one of the plurality of apertures has at least one linear side, wherein the width of the aperture of the first light-blocking member in a first direction is smaller than the width of the image-capture element in the first direction, and the width of the aperture of the first light-blocking member in a second direction is smaller than the width of the image-capture element in the second direction, wherein the first direction is perpendicular to the second direction.

13. The array of lens units as claimed in claim 12, further comprising a base layer, wherein the light-blocking layer is formed on the surface of the base layer, and the first lens array layer is formed on the light-blocking layer, and the second lens array layer is formed on the surface of the base layer that is opposite to the surface where the light-blocking layer is formed.

14. The array of lens units as claimed in claim 12, wherein the plurality of first functional lenses is arranged in a square matrix form.

15. The array of lens units as claimed in claim 12, wherein the light-blocking layer comprises a plurality of light-blocking members respectively with one of the plurality of apertures, and the plurality of light-blocking members is separated from each other.

16. An image-capturing assembly, comprising:
a plurality of lens units arranged adjacently to each other, wherein each of the plurality of lens units comprises:
a first functional lens;
a light-blocking member with an aperture arranged along an optical axis of the functional lens to alter the shape of the light passing therethrough; and a plurality of optical sensor units configured to receive the light passing through the plurality of lens units; and
a fourth functional lens, wherein the first functional lens is disposed between the fourth functional lens and the light-blocking member and contacts the fourth functional lens,
wherein at least one of the apertures of the light-blocking members is asymmetrical with respect to the corresponding optical axis,
wherein the shape of at least one of the apertures of the light-blocking members has at least one linear side, wherein the width of the aperture of the first light-blocking member in a first direction is smaller than the width of the image-capture element in the first direction, and the width of the aperture of the first light-blocking member in a second direction is smaller than the width of the image-capture element in the second direction, wherein the first direction is perpendicular to the second direction.

17. The image-capturing assembly as claimed in claim 16, wherein each of the plurality of optical sensor units comprises an image-capture element, and at least one of the apertures of the light-blocking members has a shape construction similar to the shape of the corresponding image-capture element.

\* \* \* \* \*